Figure 1:
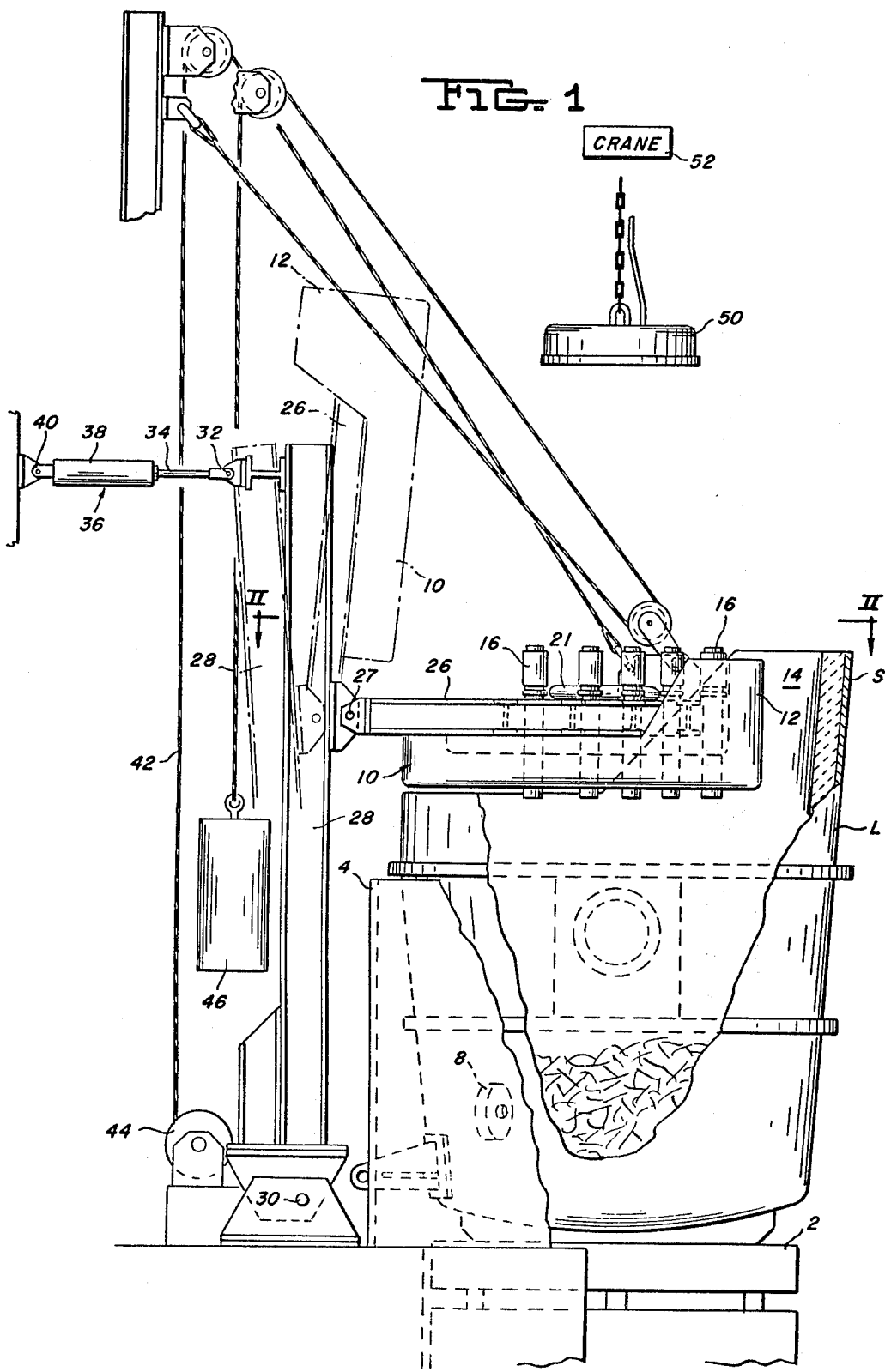

United States Patent [19]
Bloom

[11] 3,930,786
[45] Jan. 6, 1976

[54] APPARATUS FOR HEATING STEEL SCRAP

[75] Inventor: William M. Bloom, Pittsburgh, Pa.

[73] Assignee: Allegheny Ludlum Industries, Inc., Pittsburgh, Pa.

[22] Filed: Nov. 29, 1974

[21] Appl. No.: 528,184

Related U.S. Application Data

[62] Division of Ser. No. 432,387, Jan. 10, 1974, Pat. No. 3,880,649.

[52] U.S. Cl. ............... 432/156; 266/33 S; 432/210
[51] Int. Cl.² ........................................ F27B 14/00
[58] Field of Search ......... 432/5, 13, 156, 210, 211; 266/33 R, 33 S

[56] References Cited
UNITED STATES PATENTS

| | | | |
|---|---|---|---|
| 1,335,279 | 3/1920 | Dupont | 432/210 |
| 1,708,509 | 4/1929 | Loshbough | 266/33 S |
| 3,514,279 | 5/1970 | Jensen et al. | 432/156 |
| 3,734,719 | 5/1973 | Estes et al. | 266/33 R |

*Primary Examiner*—John J. Camby
*Attorney, Agent, or Firm*—Vincent G. Gioia; Robert F. Dropkin

[57] ABSTRACT

Pieces of steel scrap are charged into a ladle by a magnet on a crane so that the central part of the charge is substantially denser than the peripheral part. A cover having a plurality of natural gas-oxygen burners mounted around its periphery is then placed on top of the ladle to obtain a substantially gas tight container except for a flue opening and some small openings due to a non-tight fit between ladle and cover adjacent the top. The burners direct their flames downwardly parallel to the sidewall of the ladle and the combustion gases are discharged through the flue opening. The flames are reducing in nature and the container is under a positive pressure. The heating is continued until the scrap is at a temperature of at least approximately 1,500°F and preferably approaching the melting point of the scrap. Molten iron in substantially greater weight that the scrap and having a substantially higher carbon content is then poured into the ladle so that the majority of the scrap is melted. The mixture is then easily poured from the ladle into the oxygen converter.

8 Claims, 3 Drawing Figures

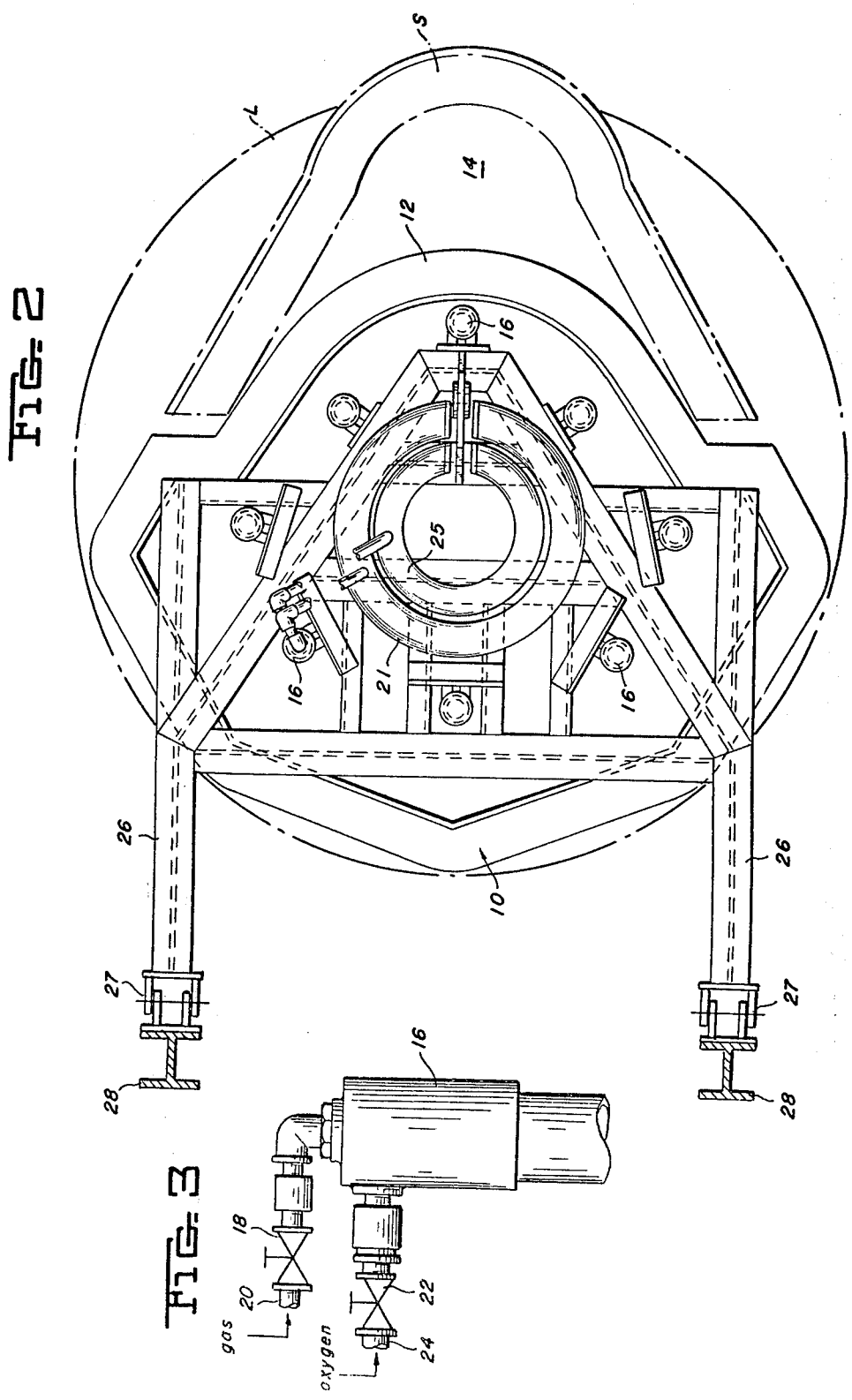

APPARATUS FOR HEATING STEEL SCRAP

This is a division of application Ser. No. 432,387, filed Jan. 10, 1974, now U.S. Pat. No. 3,880,649.

This invention relates to apparatus for heating pieces of steel scrap and particularly to the heating of light steel scrap for use in an oxygen converter. Many heating methods and preheaters for scrap have been proposed and used with electric melting furnaces and oxygen converters. Patents of which I have knowledge are Brooke U.S. Pat. No. 2,804,295 dated Aug. 27, 1967, Davies U.S. Pat. No. 2,805,143 dated Sept. 3, 1957, Brooke U.S. Pat. No. 3,180,724 dated Apr. 27, 1965, Jensen et al. U.S. Pat. No. 3,514,279 dated May 26, 1970 and Turpin et al. U.S. Pat. No. 3,645,516 dated Feb. 29, 1972. In most cases it is necessary that no melting of the scrap take place in the preheater because this would cause pieces of the scrap to fuse together and drip downward onto the bottom scrap discharge mechanism and make it inoperative.

It has also been proposed to provide a removable cover and direct a flame downwardly through the scrap and out the bottom. This has the problem of keeping the flues at the bottom open and is relatively inefficient.

Other problems include oxidation of the scrap, non-uniform and/or slow heating, inefficient operation and costly equipment.

It is therefore an object of my invention to provide apparatus for heating scrap which are efficient and inexpensive.

Another object is to provide such apparatus which heats scrap more rapidly than was previously possible.

These and other objects of the invention will become apparent to one skilled in the art after referring to the following specification and attached drawings.

FIG. 1 is an elevation, with parts cut away and shown in section, of the apparatus of my invention, FIG. 2 is a view taken on line II—II of FIG. 1; and FIG. 3 is a view of one of the burners and fuel and air connections thereto.

Referring more particularly to the drawings, reference numeral 2 indicates a scale for receiving a refractory lined ladle L and having a pouring spout S. The ladle L is guided to a centered position on scale 2 by means of guide plates 4 and guide rollers 8. A refractory lined cover 10 is provided for covering the major part of the open top of the ladle. The cover 10 does not cover the pouring spout S, and has a leg 12 extending upwardly in spaced relationship with the upwardly extending portion of spout S so as to provide a gas exhaust flue 14 therebetween. Burners 16 are mounted on top of cover 10 in spaced apart relationship around its periphery. These are commercial natural gas oxygen burners such as Linde Ab-4U. While other types of fuel, such as oil, by product gases, etc., may be used, natural gas is preferred. The burners are preferably equally spaced and extend downwardly through the cover 10 with their flames being directed downwardly generally parallel to the inside wall of the ladle and adjacent thereto. A valve 18 in each fuel supply line 20 connected to manifold 21 and a valve 22 in each oxygen supply line 24 connected to manifold 25 serve to control the fuel-oxygen ratio as well as the total amount of each. Other means, such as a proportional valve, may be used for this purpose. The leg 12 serves as a heat shield to protect the burners, piping and the steel frame work 26 of the cover from the exhaust gases and also serves to keep the ladle spout substantially free of slag. This is done by directing the hot flue gases against the spout to heat shock the slag and cause it to spall off.

The cover 10 is mounted for movement about horizontal pivot pins 27 at the end of framework 26 opposite leg 12. The pins 27 are mounted on a vertical cover support 28 which is pivotally mounted on horizontal pivot 30 adjacent its lower end. The upper end of support 28 is pivotally connected by pin 32 to piston rod 34 of a fluid motor 36 having its cylinder 38 pivotally connected to a stationary pivot 40. The cover 10 is rotated about its pivot 27 by means of cable 42 and motor 44. For ease of operation of counterweight 46 is provided for cover 10.

With the cover 10 in inoperative or open position as shown in broken lines in FIG. 1, scrap is charged into ladle L by means of a magnet 50 supported by crane 52. After the desired weight of scrap is charged as determined by scale 2 the motor 44 is operated to lower cover 10 about pivot 27, after which motor 36 is operated to move the support 28 and cover 10 inwardly to operative or closed position shown in full lines in FIG. 1. This results in a relatively gas tight container with the only openings being the flue 14 and those due to the lack of a tight fit between the cover 10 and the top of ladle L. The burners 16 are then started in operation and continue to fire until the desired heat is supplied to the scrap. The cover 10 is then retracted by operation of motor 36 which moves support 28 to its broken line position of FIG. 1 after which the cover 10 is pivoted about pivot pins 27 by operation of motor 44 to its broken line position.

My method is carried out as follows: With the cover 10 open, scrap is charged into the ladle L by means of the magnet 50 on the crane 52. The scrap is light (as compared to ingots, large castings, thick plates or slabs, etc.) silicon or other relatively low carbon steel. For example, silicon steel strip edge trimmings having a density of 47 lbs. per cu.ft., edge chopped and chopped sheets having a density of 64 lbs. per cu.ft., and mandrel and heavy bundles having a density of 168 lbs. per cu.ft. may be used in a single charge. Preferably the lighter scrap is charged first. The most dense scrap will be charged in the center under the magnet center because of the greater lines of magnet flux at this point. Sheets are pulled generally parallel to the bottom of the magnet due to stronger flux lines developed in a continuous sheet. As the scrap is charged into the ladle L, the center of the ladle is more heavily loaded with scrap than the outside periphery of the scrap load. Chopped, continuous, membrane type sheets, which impede the flow of hot burner gases in the center of the load, have their corners only touching the ladle walls. Light scrap having the 47 lb. per cu.ft. density will fill the ladle evenly from wall to wall across the ladle, but it is composed of many voids which do not seriously impede the flow of hot gases.

With a load charge that is most dense vertically in the center of the ladle and least dense at the periphery, the path of least resistance to gas flow is adjacent the refractory lined walls of the ladle. This path has considerably less flow resistance from top to bottom of the ladle than the inner area of the scrap and allows hot gas flow from the burner flame to penetrate to the ladle bottom.

A scrap charge of 28,000 lbs. may be placed in the ladle. After charging, the cover 10 is placed on the ladle L and the burners 16 turned on with a molar oxygen-natural gas ratio set preferably at approximately 1.4 to 1 so that the burners will operate at 17% reducing which prevents oxidization of the scrap. Since the ladle L with the cover 10 in place is generally gas tight, except for the flue 14 and openings between the ladle L and cover 10 which necessarily occur because of unevenness of the ladle top, and the burners are operated to maintain a positive ladle pressure no atmospheric oxygen can leak into the ladle. The flames pass downwardly parallel to the ladle sidewall and the refractory walls keep the flame temperature high enough to permit considerable preheat of the bottom scrap. The high velocity and downward flow of the hot combustion gases causes exhaust of some of the hot gases inwardly into the center of the scrap while the remainder passes upwardly adjacent the walls between the burners 16. As the center of the scrap is heated above its plastic temperature slumping of the entire mass of scrap occurs. The scrap which has a melting point of approximately 2,750°F was heated to an average temperature 2,388°F. After the cover was removed 86,000 lbs. of molten cupola iron at 2,700°F was added to the charge to obtain a mixture temperature 2,500°F. Sufficient time is generally not available before charging the oxygen converter to dissolve all the scrap. However, the solid scrap remaining is lubricated and softened by the hot metal so that it flows with the hot metal out of the ladle into the oxygen converter.

Using six gas burners each rated at a maximum input of 10,000,000 B.T.U. per hour with 10 lbs. per sq. in. natural gas and 8 lbs. per sq. in. oxygen burner pressure, a burner flame about 12 in. in diameter and 5 to 6 feet long is obtained. I have found that with a 14,000 lbs. scrap load, one scrap melting unit can supply sufficient scrap for two oxygen converters on a continuous basis. The burners have been fired for about 1 minute per 1000 lbs. of scrap or a total of 14 minutes for 14,000 lbs.

20,000 tons of scrap of .165 B.T.U. per pound degree F. specific heat have been heated in 17 minutes to an average temperature of 2,388°F at a rate of 34,000,000 B.T.U. per hour.

I have found that the scrap must be heated in a reducing atmosphere to a temperature of at least 1,500°F and preferably to a temperature approaching the melting point of the scrap. The weight of molten iron added to the scrap must be substantially greater than the weight of scrap and preferably is at least approximately three times the scrap weight. Blast furnace iron or other available iron having a high carbon content may be used in place of the cupola iron. In using the mixture in an oxygen converter solid scrap is charged into the converter prior to adding the mixture. The entire charge is then made into steel of the desired analysis by means of oxygen and the necessary additives.

While several embodiments have been shown and described herein, I intend to cover as well any change or modification therein which may be made without departing from the spirit and scope of the invention.

I claim:

1. Apparatus for heating pieces of steel scrap which comprises a refractory lined container having an open top, means for charging said steel scrap into said container with the central part of the charge substantially denser than the peripheral part, a cover for closing the top of said container, means for moving said cover between an open and closed positions, a flue opening from said container adjacent the top thereof when said cover is in closed position, a plurality of spaced apart fuel-oxygen burners mounted around the periphery of said cover, said burners being positioned to direct their flames downwardly into said container generally parallel to the inside wall thereof, and means for controlling said burners to obtain a reducing atmosphere under pressure in said container.

2. Apparatus according to claim 1 in which said means for charging scrap includes a crane having a magnet thereon.

3. Apparatus according to claim 1 in which said means for moving said cover includes a horizontal axis support, means connecting said cover to said axis support, and means for moving said cover about said axis support.

4. Apparatus according to claim 3 in which said means for charging scrap includes a crane having a magnet thereon.

5. Apparatus according to claim 1 in which said container has a generally horizontal main top portion and a spout extending upwardly from the said main portion, and said cover includes a generally horizontal leg resting on said horizontal main top portion and a vertical leg extending upwardly from said horizontal leg and spaced from the wall of said spout to provide said flue opening, said burners being mounted on said horizontal leg.

6. Apparatus according to claim 5 in which said means for moving said cover includes a vertical support extending upwardly adjacent said container at a position on the side away from said support, means pivotally mounting said vertical support on a horizontal axis adjacent the lower end thereof, means for moving said vertical support about its axis to move its upper end toward and away from said ladle, a support attached to said cover and pivotally supported on said vertical support for movement about a horizontal axis, and means for moving said cover support about its axis between a horizontal operative position and an inoperative raised position.

7. Apparatus according to claim 2 in which container has a generally horizontal main top portion and a spout extending upwardly from the said main portion, and said cover includes a generally horizontal leg resting on said horizontal main top portion and a vertical leg extending upwardly from said horizontal leg and spaced from the wall of said spout to provide said flue opening, said burners being mounted on said horizontal leg.

8. Apparatus according to claim 7 in which said means for moving said cover includes a vertical support extending upwardly adjacent said container at a position on the side away from said support, means pivotally mounting said vertical support on a horizontal axis adjacent the lower end thereof, means for moving said vertical support about its axis to move its upper end toward and away from said ladle, a support attached to said cover and pivotally supported on said vertical support for movement about a horizontal axis, and means for moving said cover support about its axis between a horizontal operative position and an inoperative raised position.

* * * * *